United States Patent

[11] 3,568,125

[72] Inventors Claude Marie Villemant
Paris;
Michel Gaultier, Gif/Yvette, France
[21] Appl. No. 767,930
[22] Filed Oct. 14, 1968
[45] Patented Mar. 2, 1971
[73] Assignee International Standard Electric Corporation
[32] Priority Oct. 20, 1967
[33] France
[31] 125,231

[54] THERMISTOR
10 Claims, 4 Drawing Figs.
[52] U.S. Cl...................................................... 338/22,
29/576, 29/573
[51] Int. Cl...................................................... H01c 7/04
[50] Field of Search........................................... 338/22;
29/573, 576

[56] References Cited
OTHER REFERENCES

Lehman et al., Fabrication of Field Effect Transistors, 9-1965, pp 677, 678

Lehman et al., Formation of Depletion and Enhancement Mode Field Effect Transistors, 9-1965, pp 675, 676

*Primary Examiner*—Rodney D. Bennett, Jr.
*Assistant Examiner*—Brian L. Ribando
*Attorneys*—Charles L. Johnson, Jr., C. Cornell Remsen, Jr., Walter J. Baum, Percy P. Lantzy, Philip M. Bolton and Isidore Togut ABSTRACT: A thermistor is formed of a semiconductor body having a layer of glass on one surface, a metallic resistance layer on the glass and ohmic contacts on the metallic layer and on another surface.

THERMISTOR

BACKGROUND OF THE INVENTION

1. Field of the Invention

The present invention relates to indirectly heated thermistors made of semiconductor material.

2. Description of the Prior Art

Devices commonly used comprise temperature sensitive resistances made of semiconductor ceramics or oxides and heated by an electric resistance. Owing to the distance between the heating resistance and the variable semiconductor resistance, the present devices have the disadvantage of large time constants which can be as long as 20 seconds. Semiconductor resistances made of oxides usually have the form of crystalline aggregates. Their main drawback lies in their low reliability, especially in the case of successive temperature cycles.

SUMMARY OF THE INVENTION

The present novel thermistor comprises a resistance of monocrystalline or polycrystalline semiconductor material, such as germanium or silicon. The semiconductor material of one type has a layer of silicon oxide on one side covered with a layer of glass on which a metallic film is deposited which forms the heating resistance. The percentage of acceptors and donors in the semiconductor is so selected as to determine the range of variation of the resistance as a function of the temperature. A glass is employed which has good insulating properties, is a good heat conductor, and has an expansion coefficient close to that of the semiconductor material. The advantages afforded by the invention are that the properties of the thermistor does not vary noticeably after being subjected to successive temperature cycles or after long use, and that the time constant is reduced to a low figure of between 0.5 and 3 seconds. Further advantages and features of the invention will become apparent from the following detailed description taken with reference to the appended drawings.

DESCRIPTION OF THE PREFERRED EMBODIMENTS

Figure 1:
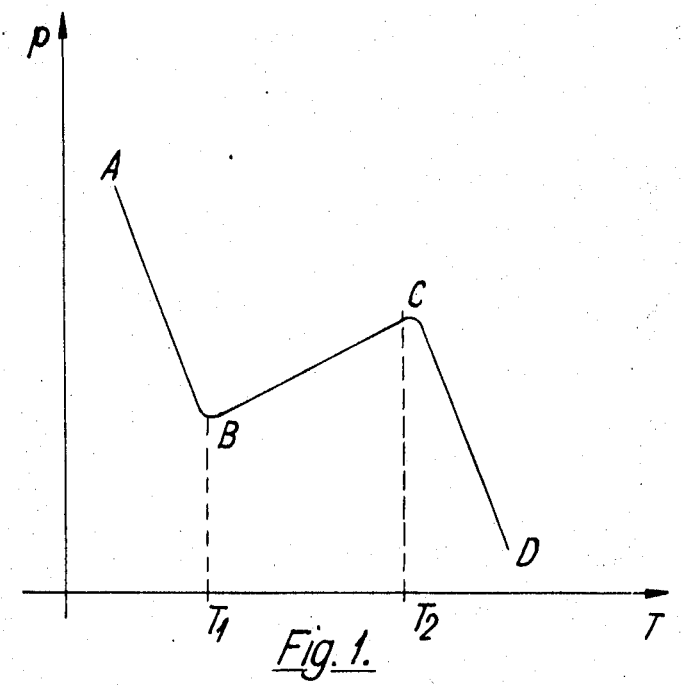
FIG. 1 shows a curve of the variation of resistivity as a function of the temperature of the two well-known semiconductor materials, germanium and silicon.

The curve in FIG. 1 illustrates variations with temperature of the parameters of the following equation:

$$\frac{1}{\rho} = e(n\mu_n + p\mu_p)$$

in this equation: $\Phi$ = resistivity
 e = electron charge
 n = number of free electrons (negative bearers)
 p = number of vacant holes (positive bearers)
 $\mu$ = electron mobility
 $\mu$ = hole mobility Portion AB of the curve corresponds to an increase in the bearers owing to the ionization of impurities and the increase in mobility. In portion BC, the number of bearers remains invariable but mobility reaches its maximum. In portion CD, resistivity is reduced owing to the increase in the number of intrinsic bearers. Since germanium and silicon have different crystalline characteristics, temperature T1 corresponding to point B and temperature T2 corresponding to point C, have different values in either case. As regards silicon, the ambient temperature is in portion BC in FIG. 1, and temperature T2 may be between 200° C. and 400° C., according to the doping level. Silicon thermistors are elements with a positive coefficient but with low excursion, the resistance value at point C being approximately two times that of the ambient temperature. For germanium, temperature T2 is in the proximity of the ambient temperature. Germanium thermistors thus have a negative temperature coefficient and have greater sensitivity than those made of silicon.

Figure 2:
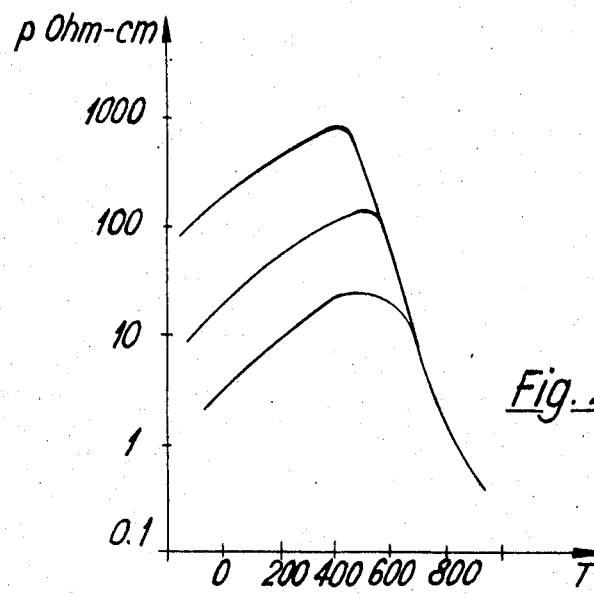
FIG. 2 shows the resistivity curve as a function of the temperature of silicon samples at various doping levels.
Figure 3:
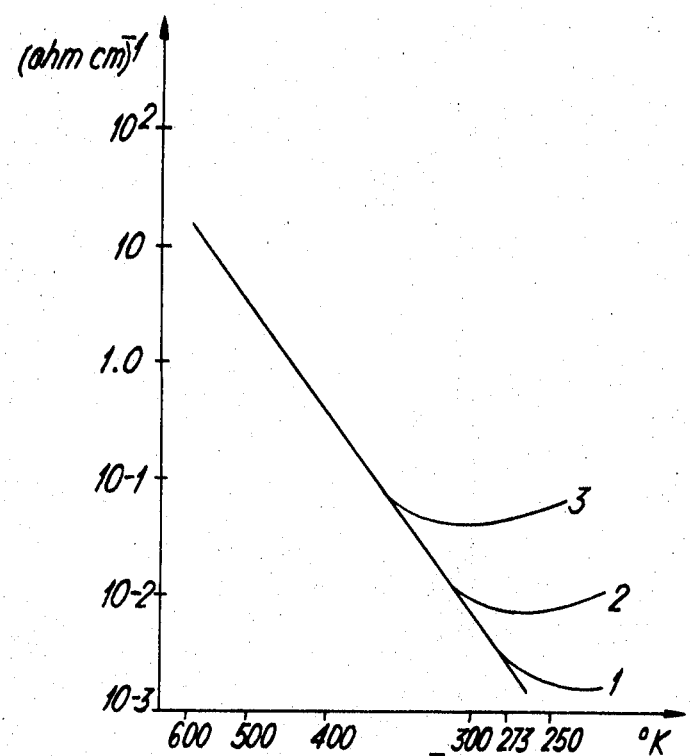
FIG. 3 shows curves of conductivity of the germanium as a function of the temperature and of the donor or acceptor concentration.

As shown in FIG. 2, the resistivity varies as a function of the temperature of different types of silicon samples doped at different levels. Curves 1, 2 and 3 of FIG. 3 represent the conductivity variation as a function of the temperature and of the donor or acceptor concentration in different germanium monocrystalline samples. All these curves have a similar shape at high temperatures as conductivity is then due primarily to the intrinsic properties of the germanium monocrystal.

The properties represented in FIGS. 1, 2 and 3 are well known in the art. A more exhaustive description of the properties of solid state devices can readily be found in recent texts such as for example "Semiconductors" by N. B. Hanney, or in "Silicon Semiconductor Technology" by W. R. Runyan. From the preceding curves, it can be seen that the semiconductor material must be chosen for its resistivity and the type of doping in order to obtain the desired thermistor working range.

Figure 4:
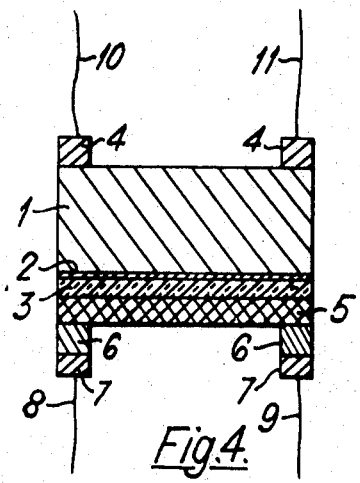
FIG. 4 schematically shows a cross section of a thermistor according to the invention.

The structure of a thermistor according to the invention is shown in FIG. 4. A semiconductor pellet 1 of germanium has a layer of silicon oxide 2 and a layer of glass 3 thereon which insulate the pellet 1 from a metallic film 5 which constitutes the heating resistance. Semiconductor 1 bears two ohmic contacts 4 to which two wires 10 and 11 are soldered. The metallic heating resistance 5 has two contacts formed by superimposed metallic layers 6 and 7. When the thermistor is operated, the connections 8 and 9 are supplied with a current which spreads in resistance film 5, the temperature of which increases. Heat is transmitted to the thin layer of glass 3, and then to semiconductor pellet 1. The temperature of the latter rises and causes a resistance variation between the two connecting wires 10 and 11.

The following description relates to an example of a process for making a germanium thermistor, however this technology applies as well to thermistors of silicon with a few modifications which will be pointed out.

First, a cylindrical slice roughly 0.4 mm. thick and a few centimeters wide is cut from a monocrystalline ingot of commercially available type N germanium, the resistivity of which equals 40 ohm-cm. The surfaces of the above mentioned circular slice are then subject to fine grinding to obtain two parallel flush surfaces. This operation is followed by mechanical polishing, then chemical polishing with a suitable solution such as the known CP4, chemical polish, acid solution, thus reducing the thickness of the slice to approximately 0.1 mm.

The next step comprises forming a layer 2, by vacuum evaporation of a layer of silicon oxide on one side of the germanium chip. The purpose of this operation is to protect the germanium surface during the following operation. When working with silicon thermistors the added oxide layer operation can be omitted.

The glass is then deposited via a centrifuging process. To achieve this, glass is first finely ground so that the average diameter of the resulting beads is roughly 1 micron. The beads are then held in suspension in a compound of ethylalcohol and amyl acetate. The germanium slice is then placed in a flat-bottomed test tube and a given quantity of the compound and beads suspended therein is poured into the test tube. The action of a centrifuge device causes the glass beads to become deposited in a uniform layer on the germanium substrate. The glass is then fused onto the substrate in a furnace heated to a temperature of about 800° C. and in a neutral medium. At the end of this operation the glass layer is from 3 to 4 microns thick. The glass in question must have good electric insulating properties and must also be a good conductor of heat and provide an expansion coefficient similar to that of germanium or silicon semiconductors. A glass such as that known under the trade name Corning 7059 offers such properties and has been found suitable.

Once the glass fusion process is completed, the free surface of the germanium slice is cleaned in order to rid it of all impurities. Contacts 4 are then affixed. This is done by means of a vacuum evaporation technique using pure gold which is evaporated through a metal mask onto the cooled substrate. The latter are then heated at 400° C. in an inert medium to form a gold-germanium alloy.

In order to reduce contact resistance when working with silicon a type N+ diffusion is effected if the original silicon is N type, or a P+ diffusion is effected if the original silicon is type P, previous to the gold deposit.

There then follows the deposit of a metallic film 5 on the glass layer 3. A nickel-chrome wire 80 percent Ni + 20 percent chrome is evaporated in vacuum and deposited on the glass layer. The layer thus deposited is checked against a reference resistance, the substrate being kept at a temperature of 380° C during evaporation.

Before soldering the connecting wires, easily solderable metal is placed at the spots provided for, on the nickel-chrome layer. A film of pure nickel is first evaporated through a metal mask by vacuum heating to form layer 6, the substrate reaching approximately 380° C. Next, layer 7 is formed and deposited by vacuum heating of gold on the substrate which reaches a temperature of 250° C during the operation. The germanium slice thus formed is then cut with a diamond cutter and broken into small pellets.

A 25 micron diameter gold wire is soldered onto contacts 4 and 7 of FIG. 4 by thermocompression The pellet is suspended from the four electrodes of a suitable case, each wire being soldered to one of the insulated output electrodes. The case is then closed and evacuated.

This type of thermistor assembly ensures high heat insulation between the thermistor and the environment. As the resistance of a thermistor depends not only on the resistivity of the semiconductor but also on its size, the dimensions of the pellets must be accurately determined. The following examples illustrate the results obtained by the process described above and the affect of the dimensions of the semiconductor pellet assembled in the thermistor.

EXAMPLE 1

Germanium pellet, 0.3 × 0.4 mm. × 0.1 mm.
Resistance variation, 300 to 30 ohms.
Power variation, 0 to 22 mW.
Stray capacity between Ge resistance and heat resistance, 3.2 pF.
Insulation resistance between Ge resistance and heat resistance, greater than 5000 Megohms for 20 v.
Time constant, 1 sec.

EXAMPLE 2

Germanium pellet, 1.1 × 0.4 × 0.1 mm.
Resistance variation, 2400 ohms to 100 ohms.
Power variation, 0 to 30 mW.
Stray capacity between Ge resistance and heat resistance, 6 pF.
Insulation resistance between germanium and the heat resistance, greater than 5000 Megohms for 20 v.
Time constant, 0.8 sec.

These thermistors have many different fields of application of which two typical embodiments follow.

In the first example, the output level of an oscillator is controlled automatically by using part of the output power of the oscillator to heat the thermistor via the heating resistance. Resistance variation of the semiconductor material brings about a variation in the feedback circuit.

In the second example, the output power of a telephone repeater is controlled as a function of the attenuation variation of the cable linked to a temperature variation. The thermistor is assembled in series in the amplifier. A detector of the temperature of the cable controls power variation in the heating resistance of the thermistor. This variation directly modifies the output level.

While the process has been described in connection with the manufacture of thermistors of germanium or silicon, it also applies to other semiconductor elements in the III—V. groups of the standard periodic table.

I claim:

1. A process for the manufacture of thermistors comprising providing a body of semiconductor material of a predetermined thickness and resistivity, polishing said body, depositing a layer of glass on one surface, heating the glass to fuse to said body, applying a metallic resistance layer on the glass, applying spaced metallic layers to said resistance layer and to another surface to form two sets of ohmic contacts, and securing wires to said contacts.

2. The process of claim 1 wherein said body is made of silicon.

3. The process of claim 1 wherein said body is made of germanium and a layer of silicon oxide is deposited on said one surface before depositing said glass.

4. The process of claim 1 wherein said metallic resistance layer is formed of nickel-chromium, said spaced metallic layers on said resistance layer being formed of a first layer of nickel and a second layer of gold on said first layer, said spaced metallic layers on said other surface and said wires being formed of gold.

5. The process of claim 1 wherein said glass has a coefficient of expansion similar to that of the semiconductor material.

6. A thermistor comprising a body of semiconductor material having a predetermined thickness and resistivity, a layer of glass fused to one surface, a metallic resistance layer on said glass, a pair of spaced metallic layer ohmic contacts on said resistance layer, a second pair of spaced metallic layer ohmic contacts on another surface, and pairs of wires respectively secured to said contacts.

7. The device of claim 6 wherein said body is of silicon.

8. The device of claim 6 wherein said body is of germanium and including a layer of silicon oxide on said one surface between said layer of glass and said body.

9. The device of claim 6 wherein said metallic resistance layer is of nickel-chromium, said ohmic contacts on said resistance layer including a first layer of nickel and a second layer of gold on said first layer, and said ohmic contacts on said other surface and said wires being of gold.

10. The device of claim 6 wherein said glass has a coefficient of expansion similar to that of the semiconductor.